Figure 9:
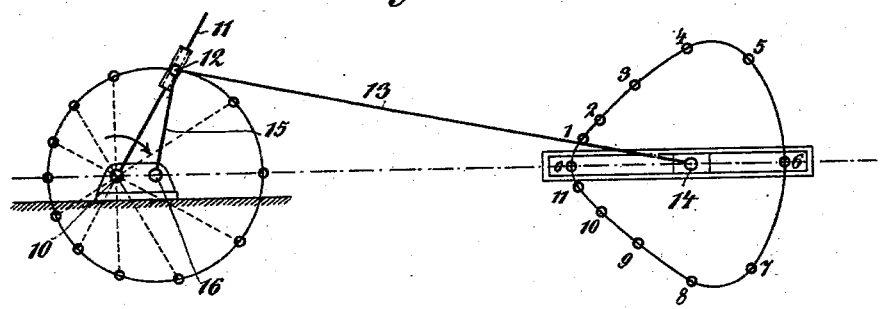

No. 757,477. PATENTED APR. 19, 1904.
H. MARCUS.
APPARATUS FOR CONVEYING MATERIALS.
APPLICATION FILED SEPT. 28, 1900.
NO MODEL. 5 SHEETS—SHEET 1.
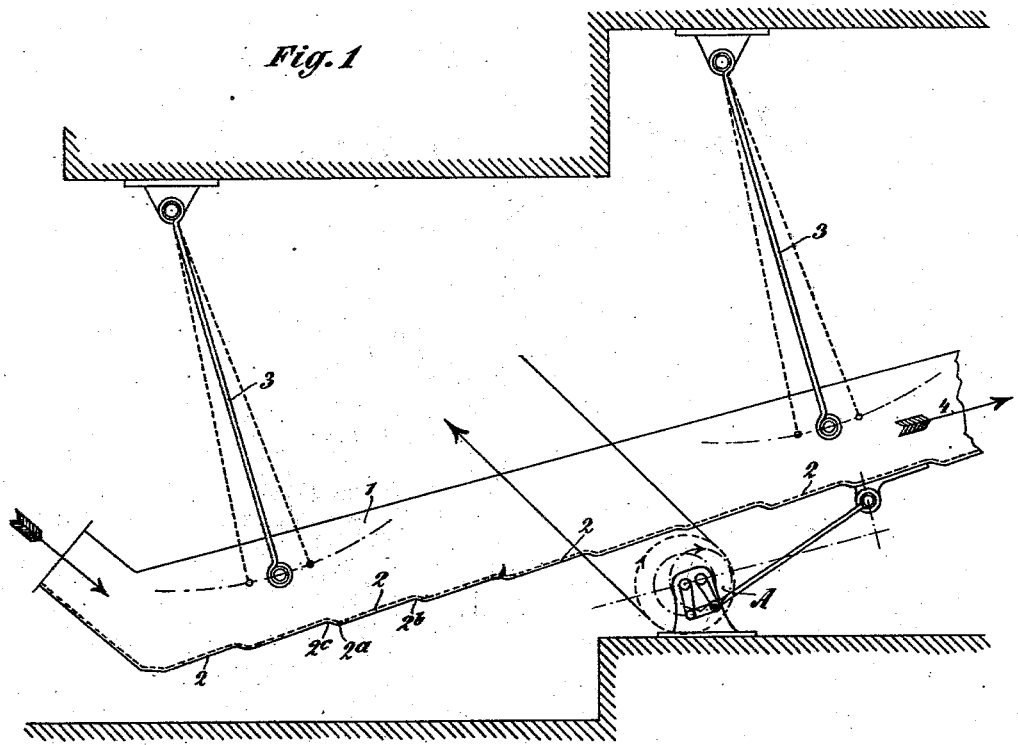
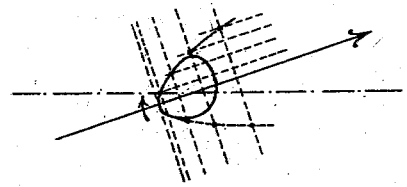
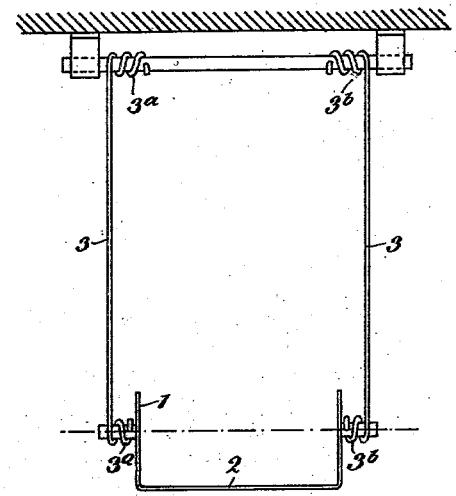

No. 757,477. PATENTED APR. 19, 1904.
H. MARCUS.
APPARATUS FOR CONVEYING MATERIALS.
APPLICATION FILED SEPT. 28, 1900.
NO MODEL. 5 SHEETS—SHEET 2.
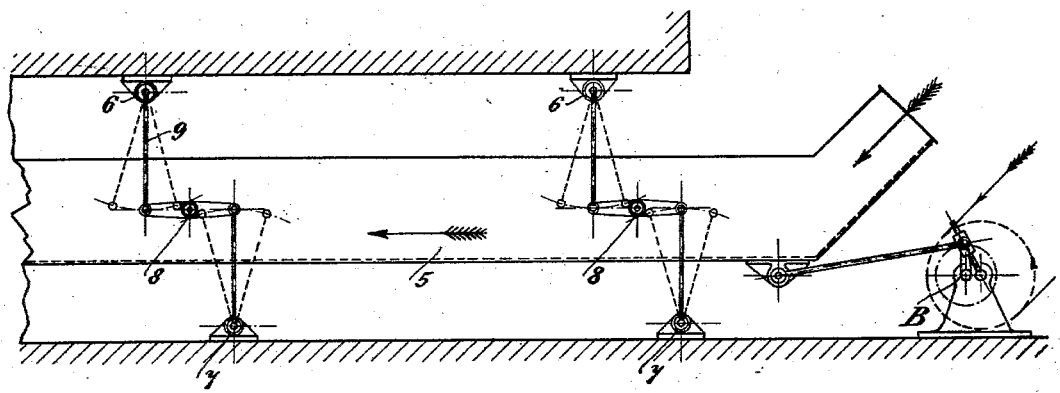
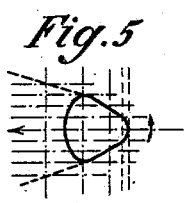
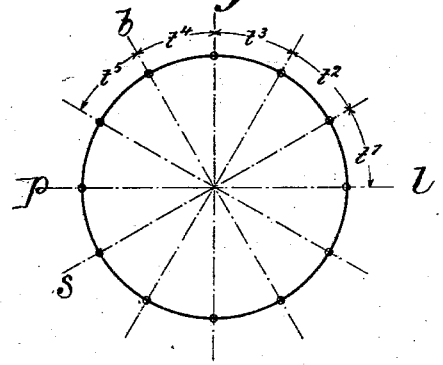
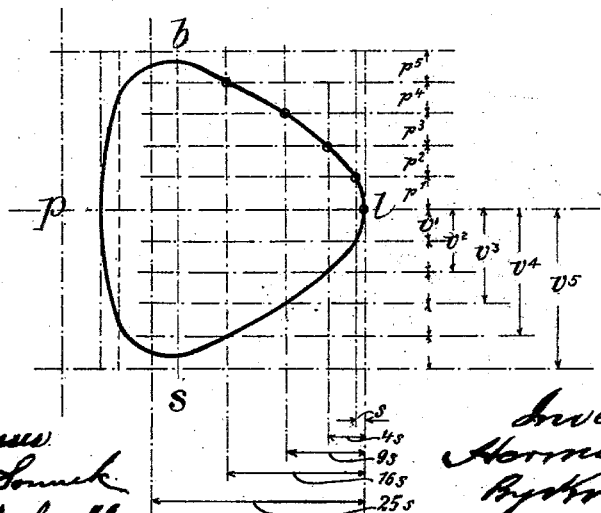

No. 757,477. PATENTED APR. 19, 1904.
H. MARCUS.
APPARATUS FOR CONVEYING MATERIALS.
APPLICATION FILED SEPT. 28, 1900.
NO MODEL. 5 SHEETS—SHEET 3.

No. 757,477. PATENTED APR. 19, 1904.
H. MARCUS.
APPARATUS FOR CONVEYING MATERIALS.
APPLICATION FILED SEPT. 28. 1900.
NO MODEL. 5 SHEETS—SHEET 4.

No. 757,477.

Patented April 19, 1904.

UNITED STATES PATENT OFFICE.

HERMANN MARCUS, OF COLOGNE, GERMANY.

APPARATUS FOR CONVEYING MATERIALS.

SPECIFICATION forming part of Letters Patent No. 757,477, dated April 19, 1904.

Application filed September 28, 1900. Serial No. 31,399. (No model.)

*To all whom it may concern:*

Be it known that I, HERMANN MARCUS, engineer, a subject of the King of Prussia, Emperor of Germany, residing at 32 Karolingerring, Cologne-on-the-Rhine, in the Kingdom of Prussia and Empire of Germany, have invented certain new and useful Improvements in a new or Improved Apparatus for Conveying Materials, of which the following is a full, clear, and exact description.

The present invention relates to a device for conveying solid, pulverized, pasty, or fluid materials. The material is conveyed, as in many well-known devices, intermittently in an oblique as well as in horizontal direction and this according to the principle as obtained in conveying material by hand by means of the ordinary throwing-shovel—that is to say, by oscillating the supporting part a certain impulse in a definite direction is imparted to the material, so that it continues to move forward in the said direction by its momentum when the supporting part diminishes the speed of its movement or moves in the opposite direction. In devices heretofore known this movement is effected in such manner, as in sifting devices, that either the supporting part is moved in a curve oblique to the conveying direction or the conveying material is thrown against surfaces oblique to the conveying-channel.

The characteristic feature of the present invention consists in the fact that the motion of the supporting part is effected in a straight longitudinal direction and that the impulse imparted to the material depends upon the uniform alteration of speed of the motion—that is to say, the combination of a novel driving mechanism with the straight-lined guiding of the supporting part makes it possible to utilize the constant pressure of the conveyed material upon the supporting part for the purpose of conveying without lifting the material from its supporting part in such conveying movement.

In contradistinction from the known devices the following results are obtained by such novel construction.

First. The material being conveyed is not thrown about, shaken, or jolted unnecessarily, because it slides forward as a solid mass. Hence the said material cannot be crushed or crumbled, which is of great importance, for instance, in the conveying of coal, coke, and many chemical products, as otherwise the said products would lose in value.

Second. The power required is diminished, because the material being conveyed travels along the shortest path, never moves in a wrong direction, and no loss of power is produced by jolting and eddying motions.

Third. The conveying capacity is brought up to the maximum by avoiding the aforesaid losses of power.

Fourth. By avoiding as far as possible all jolting, impact, and vibration important advantages accrue in the construction itself.

The driving mechanism for the supporting part producing the motion of the material has to be constructed for producing a uniform increasing or decreasing of speed, respectively, in such manner that the speed diagram has the form of a parabola which would correspond with the completest possible uniformity.

In order to produce the return of the motion from the uniform increased forward direction to the uniform decreased backward movement without a shock, this uniform acceleration or uniform retardation, respectively, has only been applied to two-thirds of the stroke, while the last third of the stroke serves to cause a quick but shockless reversal of the moving direction.

The annexed drawings represent the invention.

Figures 1 to 3 illustrate a specific form of the device for conveying in an oblique upward direction. Figs. 4 to 6 show a specific form for conveying in a horizontal direction. Figs. 7 and 8 are speed diagrams hereinafter referred to. Figs. 9 to 15 show details and parts of the driving mechanism hereinafter described.

In Fig. 1 the said material is upwardly conveyed in an oblique direction. The chute 1 is provided with shovel-surfaces 2, which are formed on straight inclines $2^a$ to $2^b$, while they are oppositely inclined from $2^a$ to $2^c$ for the purpose of giving proper resistance to the vertical pressure of the material. The conveying by means of this chute is produced nearly parallel to the surface of the shovel $2^a$ $2^b$—that is to say, in direction of the arrow 4—and this chute is suspended by correspondingly-long pendulums 3.

By the driving mechanism A, which is described more in detail later on, the chute gets a uniform acceleration in its forward movement, and this also may be seen from the diagram Fig. 2. When the speed of the chute toward the end of its forward stroke diminishes, the material slides forward along the shovels and this obliquely upward, and as soon as the chute then again oscillates rearwardly—that is to say, downwardly—the next following shovels move beneath the material. The material is thus prevented from lifting up from the shovel, but slides along each shovel and without shock over to the next one. On account of the uniform acceleration which is imparted to the chute in its forward movement by its driving mechanism the material is shifted forward in a solid mass. Alterations of the position of pieces of material by which loss of power and comminution of the material would result are thus reduced to the smallest possible limit.

Fig. 2 shows the motion diagram of the chute 1. The upper part relates to the forward movement, and the lower part to the backward movement, of the chute.

The cross-section Fig. 3 shows the preferred construction of the pendulum-hangers 3 in order to avoid friction and wearing of bolts and joints. The pendulum-hangers 3 are formed as springs, the ends of which, $3^a$ $3^b$, are wound spirally on the attaching parts.

In Fig. 4 a form of the device for horizontal conveying is represented. The conveying takes place during the forward movement as well as during the backward movement of the chute 5. The horizontal guiding—that is to say, the guiding in the conveying direction—is produced by the fact that here, as hanging-up device, lemniscoid guiders are employed, by which a double-sided support of the chute 5 is provided. The supporting-points 6 and 7 are provided on two wall-surfaces situated above each other. The chute is suspended at the points 8, which move in a right line in the oscillation of the supporting-guide. By the driving mechanism B, which is also described more in detail later on, the motion of the chute 5 is effected with uniform acceleration in the forward stroke and uniform retardation in the backward stroke. The advantages of such device are considerably pointed out in this construction. In order that the material to be conveyed may acquire a great momentum in the direction of conveying, it is necessary that in taking up such momentum it remains without motion with respect to the supporting part. As the guiding of the latter is on a straight line, the pressure which the conveying material imparts to the supporting part is constant, and hence the resistance of friction between the conveyed material and the supporting part is likewise constant.

If a maximum of active force is to be imparted to the conveying material during the action, the increase of the force must never be greater, but possibly equal, to the constant friction resistance. From this directly the result may be taken that the acceleration of the motion in the conveying direction during the taking up of momentum by the material is also constant—that is to say, that the motion has to be a uniformly-accelerated one.

If in addition to the forward movement of the material during the forward movement of the chute 5 a forward shifting of the material has to occur during the backward movement of the chute, it is profitable to draw back the chute at the beginning quickly, so that the material on account of the *vis inertiæ* of the mass will retain its position or forward movement while the chute beneath it is drawn back, and the maximum of performance with the smallest expenditure of power results if the movement of the chute is a uniformly-diminishing one.

The diagram Fig. 5, which results by the operation of the duplex crank device B, (shown in Fig. 4,) corresponds practically with the motion of the uniform accelerated forward movement of the chute in the conveying direction and correspondingly uniform retarded backward movement.

Fig. 6 shows how to profitably form the supporting-guides 9 as springs, the ends of which, $9^a$ and $9^b$, are wound spirally in order to avoid the use of bolts and joints.

Figs. 7 and 8 serve for explanation of the nature of origin of the speed diagram, the characteristic feature of this invention. Fig. 7 represents the circle-way of the driving-disk, while Fig. 8 indicates the motion and speed diagram of the chute.

Referring to the diagram Fig. 7, the speed increases approximately uniformly from $a$ to $b$, decreases quickly from $b$ to $c$, increases again from $c$ to $d$ in the same manner, and finally is retarded uniformly from $d$ to $a$. $t'$ $t^2$, &c., indicate the units of motion in which a certain point of the driving-disk has passed in its circular path, and $p$ the corresponding acceleration of the speed of the chute relating thereto. The motion of the latter point will be seen to be a uniformly-accelerated one when in equal spaces of time the acceleration $p$ increases to the same extent, and then the distances S, counted from the zero-point of the motion, have to be proportionate to the second power of times. In case the driving mechanism in Fig. 7 rotates at a uniform angle speed the single equal pieces of the circle $t'$, $t^2$, $t^3$, $t^4$, and $t^5$ will be passed in equal times, and the accelerations relating thereto, $p'$, $p^2$, $p^3$, $p^4$, and $p^5$ of the chute, are equal to each other according to Fig. 8. The speeds $v' = 1\,p$, $v^2 = 2\,p$, $v^3 = 3\,p$, $v^4 = 4\,p$, $v^5 = 5\,p$ are proportionate to the times, counting from the zero-point and the ways S, to the second powers of the times. According to Figs. 7 and 8 this uniform accelerated or retarded motion, respectively, takes place during about seventy-five per cent. of each revolution and seventy per cent. of the stroke with nearly mathematical accuracy. The other part of the motion serves for the turn of the moving direction and must not be made smaller if the device is to be worked without injurious shock. In order to obtain such motion, according to Figs. 9 and 10 a variable crank device is employed as a driving mechanism, the crank-wrist of which, forming the connection-point for the shifting-rods, is guided in such manner that its distance from the crank-shaft during each revolution is constantly changing between the maximum and minimum. In Fig. 9, 10 represents the crank-shaft, 11 the crank-arm, and 12 the wrist-pin, mounted by a slide on the crank-arm 11. On the pins 12 (one shown) the shifting-rods 13 are pivoted, and they are joined at 14 to the chute. The crank-pin 12, as mentioned, has to be applied or guided in such manner that its distance from the center of the crank-shaft 10 in each crank revolution is continuously changing between the minimum and maximum. For this purpose the crank-pin 12 is arranged adjustably on the crank 11 and is shifted to and fro upon the latter by a guide-link 15, revolving around a pivot 16 in each revolution of the crank 11. The influence resulting therefrom upon the speed of the motion of the conveying-chute may be best recognized in the speed diagram shown at the right-hand part of Fig. 9, which is identical with Fig. 8.

Figure 10:
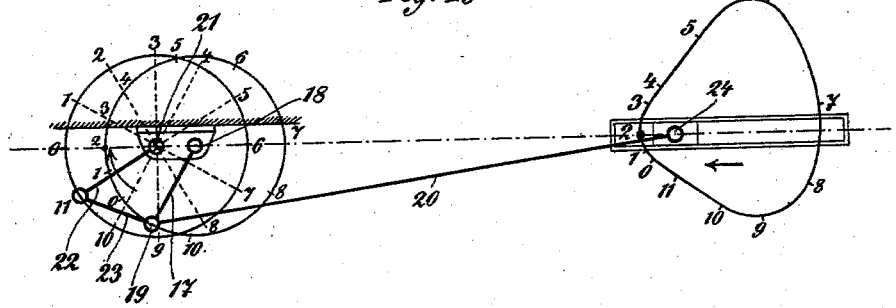

The driving mechanism and the diagram shown in Fig. 10 correspond in essential particulars with Fig. 9. A guide-link 17, rotating around its center-pin 18, has also the purpose to alter continuously the distance of the pivot 19 at which the shifting-rod 20 is fastened from the turning center of the driving-axle in each revolution from a minimum to a maximum. The difference is only that the transmitting-pin 19, on which the connecting-rod 20 is pivoted, is not fastened directly to the crank-arm 22, but is connected to the latter by a second guide-link 23. The shifting-rod is fastened to the chute at 24, and it will be seen by the speed diagram that this form of the device effects the same practical result.

Figure 11:
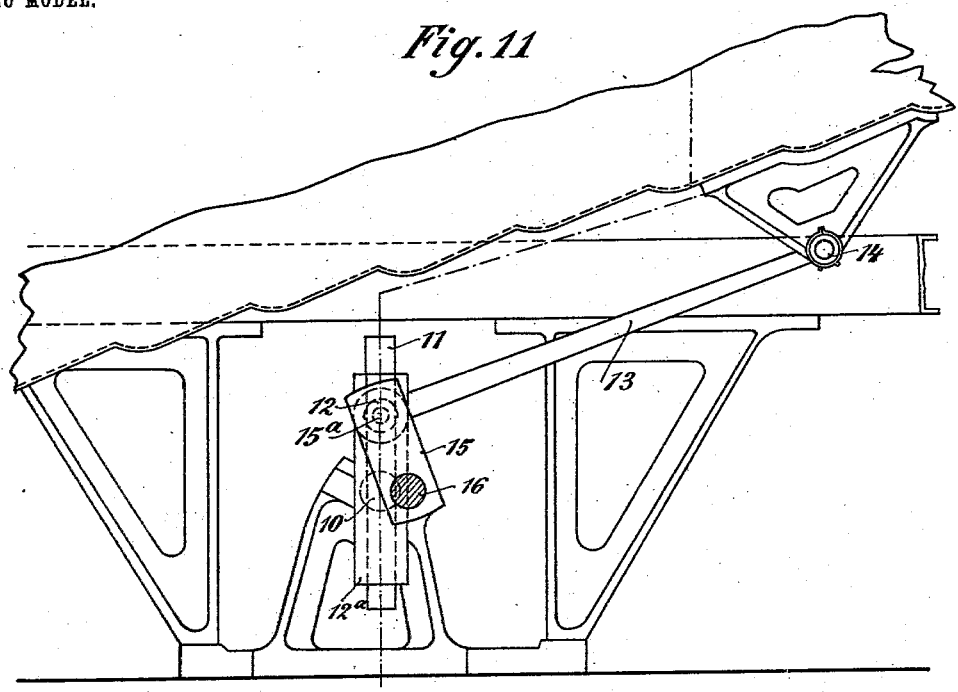
Figure 12:
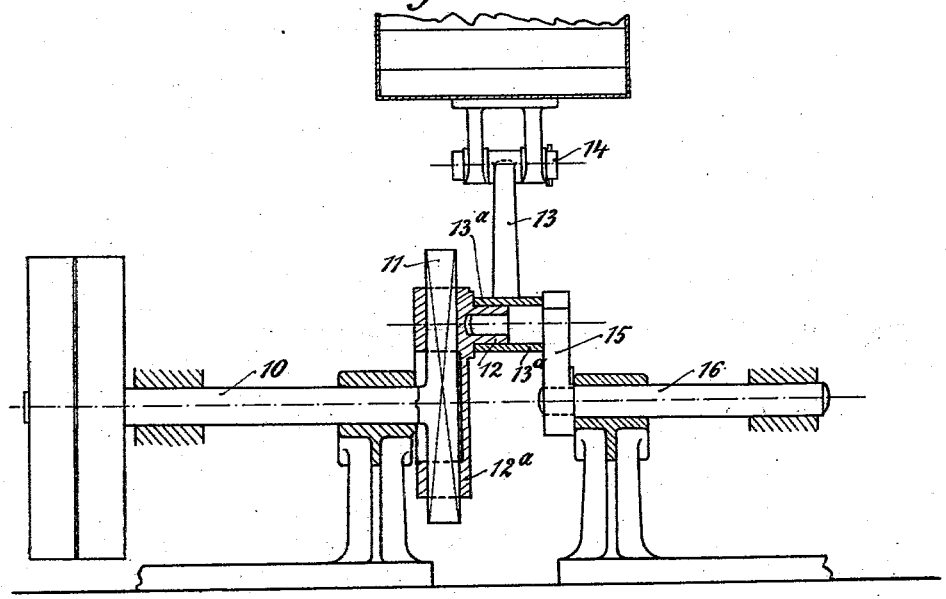
Figure 13:
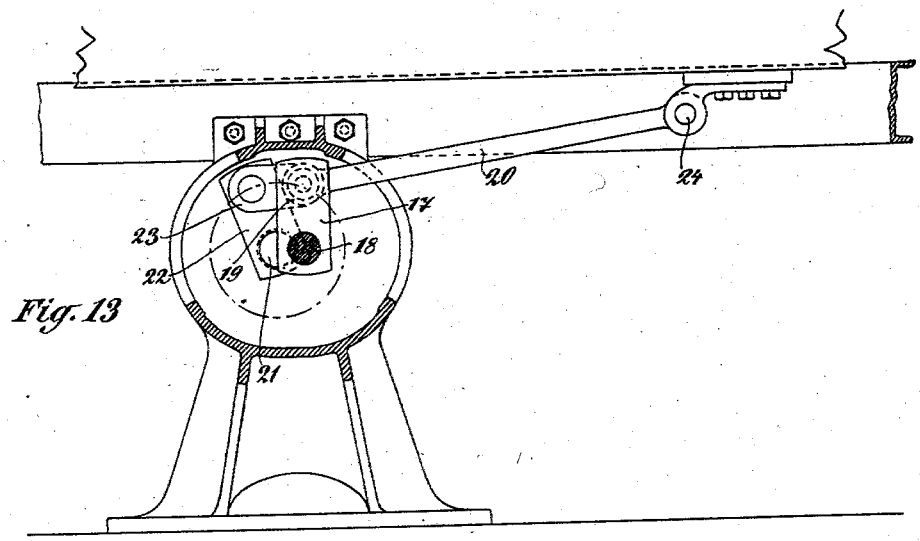
Figure 15:
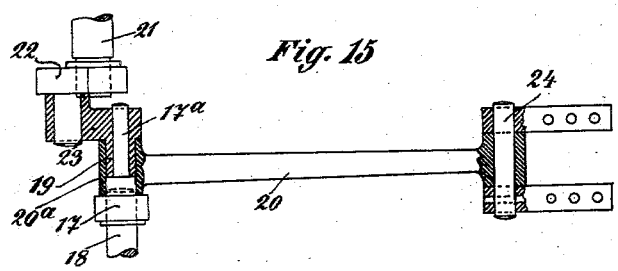
Figure 14:
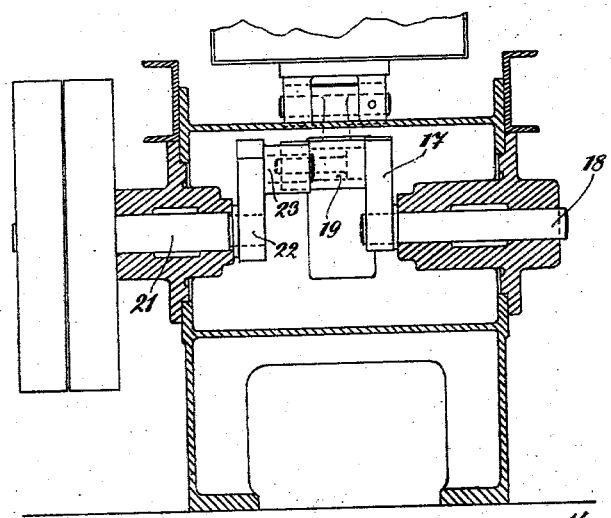

Exact detail constructions as to the driving mechanism are shown in Figs. 11 to 15. Figs. 11 and 12 relate to the diagram Fig. 9, while Figs. 13 to 15 relate to the diagram Fig. 10. These representations are to show how the shifting-rods 13 or 20, respectively, are practically applied to the crank device.

In Figs. 11 and 12 the crank-pivot 12 is guided by a sleeve $12^a$ upon the crank 11. Concentrically to the crank-pivot 12 the bolt $15^a$ of the guider 15 is inserted and effectuates the shifting of the same upon crank 11 in each revolution. The shifting-rod 13, joined at 14 to the chute, lies with its eye part $13^a$ around the bolts of the crank 11 and the guider 15 concentrically inserted into each other and avoids thereby the applying of a second guide-crank. In all its parts the operation of this driving mechanism is clearly brought out in the description of Figs. 9 and 10.

Having thus described my invention, the following is what I claim as new therein and desire to secure by Letters Patent:

1. In an apparatus for conveying materials, the combination of a carrier effecting motion of the material, guided in a right line, and means substantially as described, imparting to said carrier and material carried thereby a progressively-accelerating motion in a forward direction and drawing said carrier beneath the material by a reverse movement quick at first and progressively retarded in speed in the return stroke, as explained.

2. In an apparatus for conveying materials, the combination of the chute 1 having at bottom carrying-surfaces 2 gradually inclined upward in a forward direction from $2^a$ to $2^b$ and shoulders $2^a$, $2^c$ at rear of said carrying-inclines, means for guiding said chute longitudinally in an approximately rectilinear longitudinal movement, connecting-rods 13 jointed at one end to the chute; and crank mechanism substantially as described, pivoted to the opposite ends of the connecting-rods and actuating the chute in a reciprocating movement accelerating uniformly in speed from beginning toward the end of the forward stroke and by a reverse movement quick at first and uniformly diminishing in speed to the end of the backward stroke, as and for the purposes explained.

In witness whereof I subscribe my signature in presence of two witnesses.

HERMANN MARCUS.

Witnesses:
CHARLES LESIMPLE,
KARL SCHMITT.